United States Patent
Chan et al.

(10) Patent No.: US 9,565,528 B2
(45) Date of Patent: Feb. 7, 2017

(54) PROVIDING A MESSAGE BASED ON TRANSLATING A BEACON IDENTIFIER TO A VIRTUAL BEACON IDENTIFIER

(71) Applicant: Verizon Patent and Licensing Inc., Arlington, VA (US)

(72) Inventors: Victor D. Chan, Newton, MA (US); Paul V. Hubner, McKinney, TX (US); Abby Charfauros, San Diego, CA (US); Wylene Sweeney, York, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/681,611

(22) Filed: Apr. 8, 2015

(65) Prior Publication Data
US 2016/0302036 A1    Oct. 13, 2016

(51) Int. Cl.
*H04W 24/00* (2009.01)
*H04W 4/02* (2009.01)
*H04W 4/12* (2009.01)

(52) U.S. Cl.
CPC ............ *H04W 4/023* (2013.01); *H04W 4/025* (2013.01); *H04W 4/021* (2013.01); *H04W 4/12* (2013.01)

(58) Field of Classification Search
CPC ...... H04W 4/005; H04W 4/006; H04W 4/008; H04W 4/02; H04W 4/025; H04W 4/04; H04W 4/06; H04W 4/12; H04W 92/08; H04W 60/04; H04W 68/00; H04W 4/023; H04W 4/021
USPC .................. 455/414.1, 421, 422.1, 458, 459, 466,455/41.1, 41.2, 456.1, 456.5
See application file for complete search history.

(56) References Cited

U.S. PATENT DOCUMENTS

| | | | | |
|---|---|---|---|---|
| 2004/0006593 | A1* | 1/2004 | Vogler | G06Q 10/10 709/203 |
| 2008/0081646 | A1* | 4/2008 | Morin | H04W 4/12 455/466 |
| 2010/0167726 | A1* | 7/2010 | Schwalb | H04Q 3/0025 455/433 |
| 2010/0235911 | A1* | 9/2010 | Nooren | H04L 63/1441 726/22 |
| 2015/0141003 | A1* | 5/2015 | Dumbleton | H04W 4/20 455/433 |
| 2015/0237487 | A1* | 8/2015 | Titcombe | H04W 4/14 455/466 |
| 2016/0044450 | A1* | 2/2016 | Huh | H04W 4/02 455/456.3 |
| 2016/0063606 | A1* | 3/2016 | Fedak | G01S 5/0252 705/15 |

(Continued)

OTHER PUBLICATIONS

AltBeacon, "AltBeacon: The Open and Interoperable Proximity Beacon Specification," http://altbeacon.org/, Jul. 27, 2014, 2 pages.

(Continued)

*Primary Examiner* — Jean Gelin

(57) ABSTRACT

A system may receive a beacon identifier. The system may translate the beacon identifier to a virtual beacon identifier. The virtual beacon identifier may be associated with an entity. The system may determine message information based on the virtual beacon identifier. The message information may include information associated with a message to be provided for display to a user and may be associated with the entity. The system may provide, for display to the user, the message associated with the message information.

20 Claims, 12 Drawing Sheets

(56) References Cited

U.S. PATENT DOCUMENTS

2016/0086029 A1* 3/2016 Dubuque .......... G06K 9/00536
382/159
2016/0092966 A1* 3/2016 Vigier ................ G06Q 30/0633
705/26.8

OTHER PUBLICATIONS

Gimbal, "Powerful, personalized, mobile engagement in the physical world," http://www.gimbal.com/, Dec. 11, 2014, 8 pages.
Wikipedia, "iBeacon," http://en.wikipedia.org/wiki/IBeacon, Mar. 4, 2015, 8 pages.

* cited by examiner

PROVIDING A MESSAGE BASED ON TRANSLATING A BEACON IDENTIFIER TO A VIRTUAL BEACON IDENTIFIER

BACKGROUND

A proximity beacon may transmit a beacon identifier, associated with the proximity beacon, such that a nearby user device (e.g., smart phone, mobile phone, etc.) receives the beacon identifier. The user device may automatically provide the beacon identifier to an application server, and the application server may generate and transmit a message (e.g., a text message, an email message, a video message, etc.), associated with the proximity beacon, to the user device for display to a user.

DETAILED DESCRIPTION OF PREFERRED EMBODIMENTS

The following detailed description of example implementations refers to the accompanying drawings. The same reference numbers in different drawings may identify the same or similar elements.

A beacon device (e.g., a proximity beacon) may be used to automatically cause a message (e.g., a text message, an email message, a video message, a push notification, a web document, etc.) to be provided to a user device (e.g., a smart phone, a mobile phone, etc.) when the user device is within a transmission area of the beacon device. In some cases, the beacon device may be associated with one or more entities (e.g., a retail store, a restaurant, a transportation station, a company, etc.). For example, a beacon device may be associated with a retail store in which the beacon device is geographically located, such that the beacon device causes user devices within the transmission area to receive a message associated with the retail store.

However, in some cases, the beacon device may change from being associated with a first entity to being associated with a different entity. As such, the beacon identifier transmitted by the beacon device may need to be updated to reflect the association with the different entity. For example, a location of the beacon device may change from a retail store to a restaurant, and the beacon identifier may need to be updated to reflect the change (e.g., such that user devices receive messages associated with the restaurant rather than the retail store). However, updating the beacon identifier to reflect the association with the different entity may be difficult and/or time consuming (e.g., when the beacon device must be manually reprogrammed).

Implementations described herein may allow a user device to translate a beacon identifier, associated with a beacon device, to one or more virtual beacon identifiers associated with one or more entities. By implementing such a beacon translation, the one or more entities, associated with the beacon device, may be changed without requiring a manual update of the beacon device.

Figure 1:
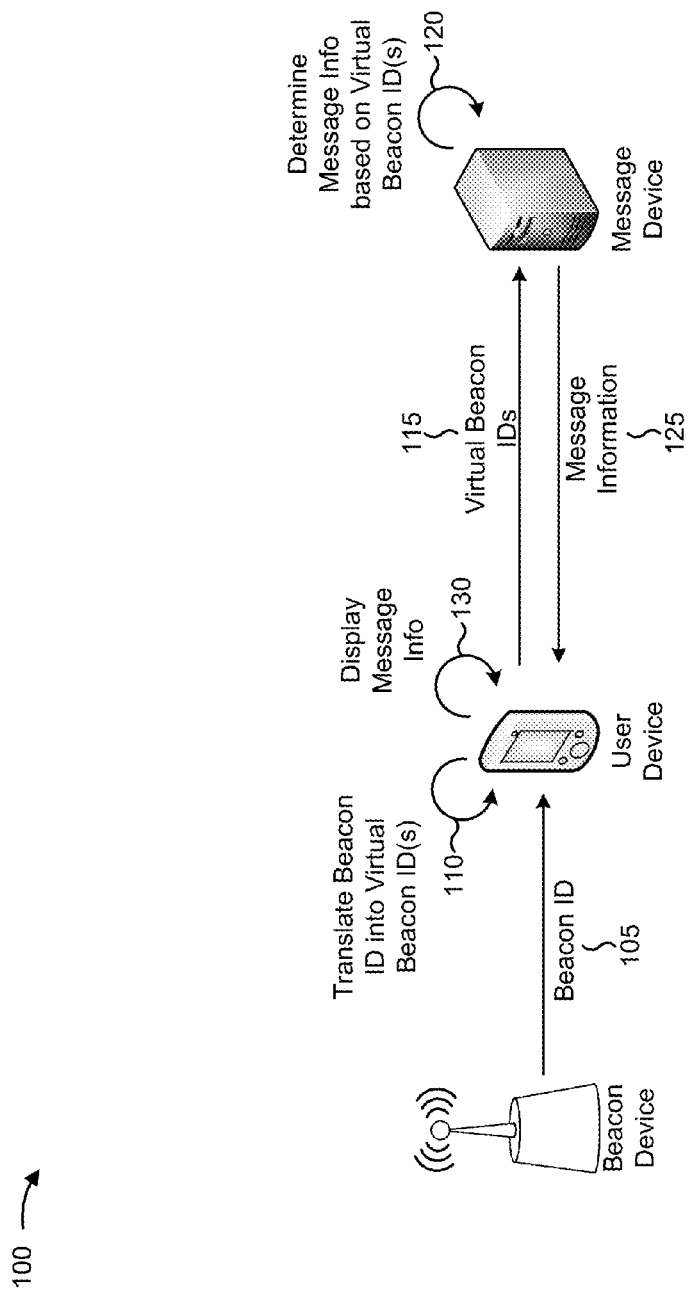
FIG. 1 is a diagram of an overview of an example implementation described herein.

FIG. 1 is a diagram of an overview of an example implementation 100 described herein. For the purposes of example implementation 100, assume that a user device is capable of receiving messages associated with beacon devices (e.g., proximity beacons located in retail stores, restaurants, transportation stations, etc.), when the user device is within transmission areas of the beacon devices. Further, assume that the user device stores or has access to virtual beacon information that may be used to translate a beacon identifier to one or more virtual beacon identifiers.

As shown in FIG. 1, and by reference number 105, the user device may receive a beacon identifier transmitted by a beacon device (e.g., when the user is in a transmission area of the beacon device). As shown by reference number 110, the user device may translate (e.g., based on the virtual beacon information and the beacon identifier) to one or more virtual beacon identifiers corresponding to the beacon identifier. In some implementations, the virtual beacon information stored or accessible by the user device may be updated based on a beacon device changing association from a first entity to a second entity. In other words, the virtual beacon identifiers may be updated rather than the beacon identifier, associated with the beacon device, being updated.

As shown by reference number 115, the user device may provide the one or more virtual beacon identifiers to a message device associated with determining message information based on the virtual beacon identifiers. As shown by reference number 120, the message device may determine message information based on the one or more virtual beacon identifiers and based on information stored or accessible by the message device. As shown by reference number 125, the message device may provide the message information to the user device. As shown by reference number 130, the user device may provide the message information for display to the user (e.g., such that the user may view one or more messages included in the message information).

In this way, a user device may translate a beacon identifier, associated with a beacon device, to one or more virtual beacon identifiers associated with one or more entities. By implementing such beacon translation, the one or more entities, associated with the beacon device may be changed without requiring a manual update of the beacon device.

Figure 2:
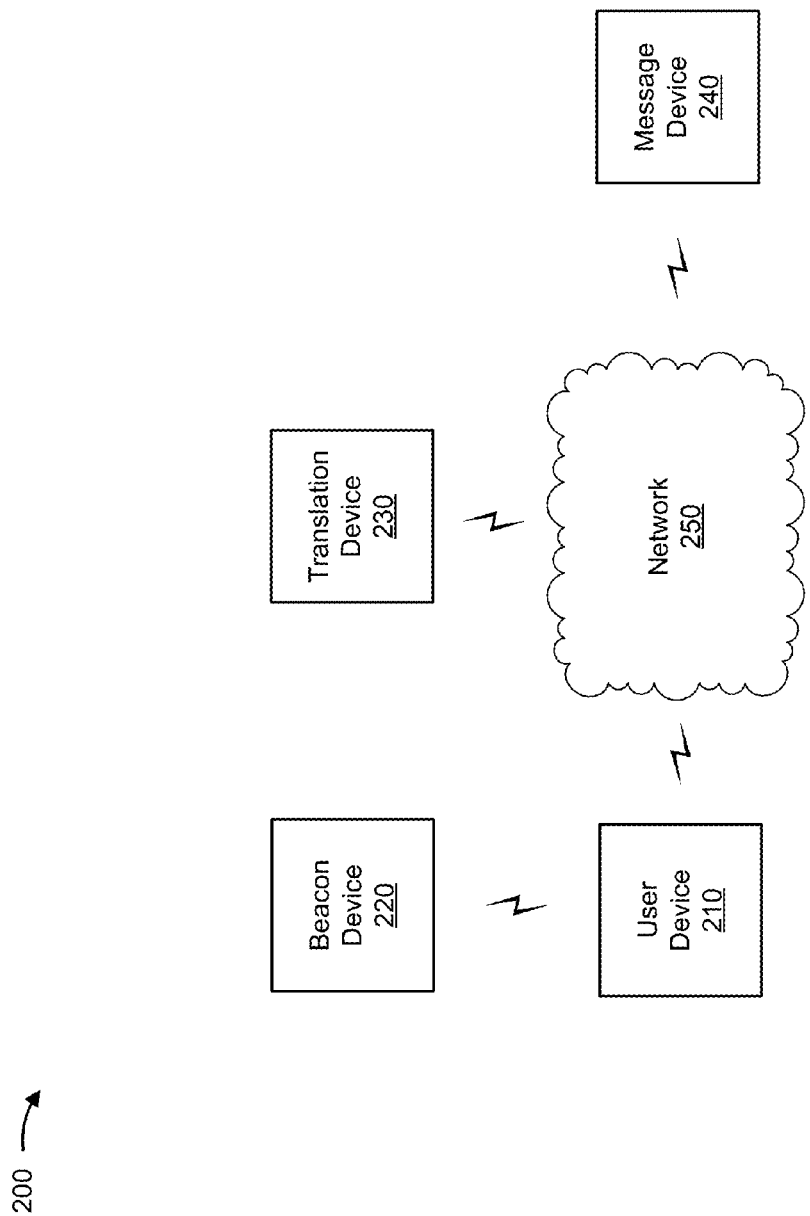
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a beacon device 220, a translation device 230, a message device 240, and a network 250. Devices of environment 200 may interconnect via wired connections, wireless connections, or a combination of wired and wireless connections.

User device 210 may include one or more devices capable of receiving, generating, storing, processing, and/or providing information associated with a message based on user device 210 being within a transmission area of beacon device 220. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a billboard device (e.g., an electronic billboard capable of displaying information to a user), or a similar type of device. In some implementations, user device 210 may be capable of receiving and/or storing virtual beacon information and/or translating a beacon identifier to a virtual beacon identifier based on the virtual beacon information. In some implementations, user device 210 may receive information from and/or transmit information to another device in environment 200.

Beacon device 220 may include one or more devices capable of receiving, generating, storing, processing, and/or providing information that identifies beacon device 220. For example, beacon device 220 may include a Bluetooth device, a near-field communication (NFC) device, a wireless local area network (WLAN) (e.g., WiFi) device, a smart tag, a quick response (QR) code tag, and/or another transponder-based device. In some implementations, beacon device 220 may be associated with an entity, such as a company, a business, a retail store, a transportation station, a restaurant, or the like. In some implementations, beacon device 220 may be capable of transmitting (e.g., continuously, repeatedly, periodically, on-demand, etc.) a beacon identifier (e.g., information that identifies beacon device 220) within a transmission area covered by beacon device 220 such that the beacon identifier may be received by user devices 210 within the transmission area.

Translation device 230 may include one or more devices capable of receiving, storing, processing, and/or providing virtual beacon information associated with one or more beacon identifiers. For example, translation device 230 may include a server device or a collection of server devices. In some implementations, translation device 230 may include a communication interface that allows translation device 230 to receive information from and/or transmit information to other devices in environment 200.

Message device 240 may include one or more devices capable of receiving, generating, storing, processing, and/or providing message information associated with a virtual beacon identifier. For example, message device 240 may include a server device or a collection of server devices. In some implementations, message device 240 may include a communication interface that allows message device 240 to receive information from and/or transmit information to other devices in environment 200.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
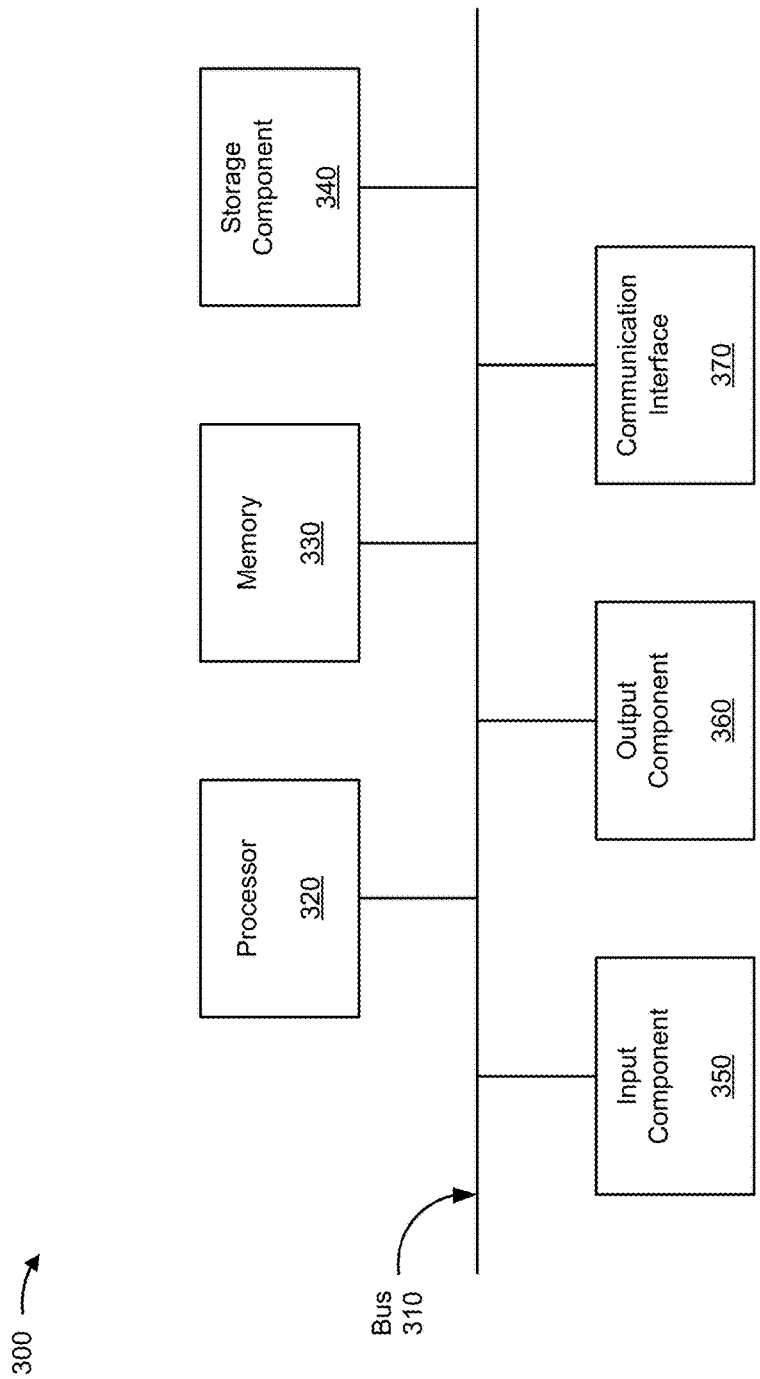
FIG. 3 is a diagram of example components of one or more devices of FIG. 2.

FIG. 3 is a diagram of example components of a device 300. Device 300 may correspond to user device 210, beacon device 220, translation device 230, and/or message device 240. In some implementations, user device 210, beacon device 220, translation device 230, and/or message device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
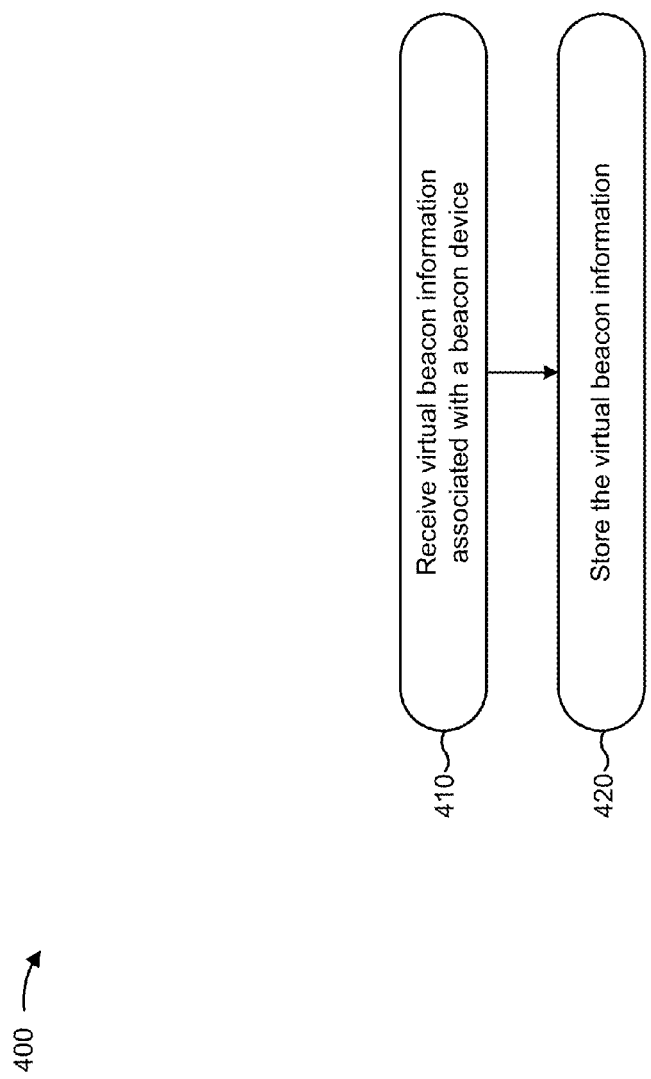
FIG. 4 is a flow chart of an example process for receiving and storing a virtual beacon identifier corresponding to a beacon identifier.

FIG. 4 is a flow chart of an example process 400 for receiving and storing a virtual beacon identifier and a corresponding beacon identifier. In some implementations, one or more process blocks of FIG. 4 may be performed by user device 210. In some implementations, one or more process blocks of FIG. 4 may be performed by another device or a set of devices separate from or including user device 210, such as beacon device 220, translation device 230, and/or message device 240.

As shown in FIG. 4, process 400 may include receiving virtual beacon information associated with a beacon device (block 410). For example, user device 210 may receive virtual beacon information associated with beacon device 220. In some implementations, user device 210 may receive the virtual beacon information when the virtual beacon information is provided by another device, such as translation device 230 and/or a device associated with a service provider of user device 210.

The virtual beacon information may include information associated with translating a beacon identifier to a virtual beacon identifier associated with an entity. For example, the virtual beacon information may include information that identifies beacon device 220 (e.g., a beacon identification number, a beacon name, etc.) and information that identifies a virtual beacon corresponding to the beacon identifier (e.g., virtual beacon identification number, a virtual beacon name, etc.). A virtual beacon may include a non-physical (e.g., conceptual, simulated, imaginary, etc.) beacon device associated with an entity, such as a retail store, a restaurant, a company, a business, or the like.

In some implementations, the virtual beacon identifier may correspond to the beacon identifier (e.g., such that user device 210 may determine the virtual beacon identifier based on the beacon identifier, as described below). Additionally, or alternatively, the same virtual beacon identifier may correspond to multiple beacon identifiers (e.g., such that user device 210 may determine the virtual beacon identifier based on any of the multiple beacon identifiers). Additionally, or alternatively, multiple virtual beacon identifiers may correspond to the beacon identifier (e.g., such that user device 210 may determine multiple virtual beacon identifiers based on a single beacon identifier).

In some implementations, the virtual beacon information may include information associated with beacon device 220, such as geographic location information associated with beacon device 220 (e.g., a location identifier, a set of global positioning system (GPS) coordinates, etc.), a beacon type of beacon device 220, or the like.

Additionally, or alternatively, the virtual beacon information may include information associated with translating the beacon identifier to the virtual beacon identifier. For example, the virtual beacon information may include time information associated with the virtual beacon identifier (e.g., user device 210 is to translate the beacon identifier to the virtual beacon identifier during at a particular time range, such as a range of hours of a day, a range of days of a week, etc.), profile information associated with the virtual beacon identifier (e.g., information indicating that user device 210 is to translate the beacon identifier to the virtual beacon identifier based on profile information associated with user device 210, such as a demographic information associated with the user, membership information associated with the user, etc.), and/or another type of information associated with translating the beacon identifier to the virtual beacon identifier.

In some implementations, user device 210 may receive the virtual beacon information from beacon device 220, translation device 230, message device 240, and/or a device associated with a service provider of user device 210.

Additionally, or alternatively, the beacon identifier may include information associated with another manner in which user device 210 may receive a message based on detecting, sensing, scanning, or the like, the beacon identifier. For example, the virtual beacon information may be associated with a quick response (QR) code that may be scanned by user device 210, a near-field communication (NFC) tag that may be detected by user device 210, or the like (e.g., rather than a beacon identifier transmitted by beacon device 220). While implementations described herein are described primarily in the context of the beacon identifier being associated with beacon device 220, these implementations may equally apply to such other manners in which user device 210 may receive a message based on detecting, sensing, scanning, or the like, the beacon identifier.

As further shown in FIG. 4, process 400 may include storing the virtual beacon information (block 420). For example, user device 210 may store the virtual beacon information. In some implementations, user device 210 may store the virtual beacon information when user device 210 receives the virtual beacon information. Additionally, or alternatively, user device 210 may store the virtual beacon information when user device 210 receives information indicating that user device 210 is to store the virtual beacon information.

In some implementations, user device 210 may store the virtual beacon information in a memory location (e.g., a RAM, a ROM, a cache, a hard disk, etc.) of user device 210. Additionally, or alternatively, user device 210 may provide the virtual beacon information to another device for storage.

In some implementations, user device 210 may store information associated with the virtual beacon information such that a previous virtual beacon information (e.g., received at an earlier time) is supplemented, overwritten, edited, and/or deleted. Additionally, or alternatively, user device 210 may store the virtual beacon information such that user device 210 may retrieve the virtual beacon information at a later time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
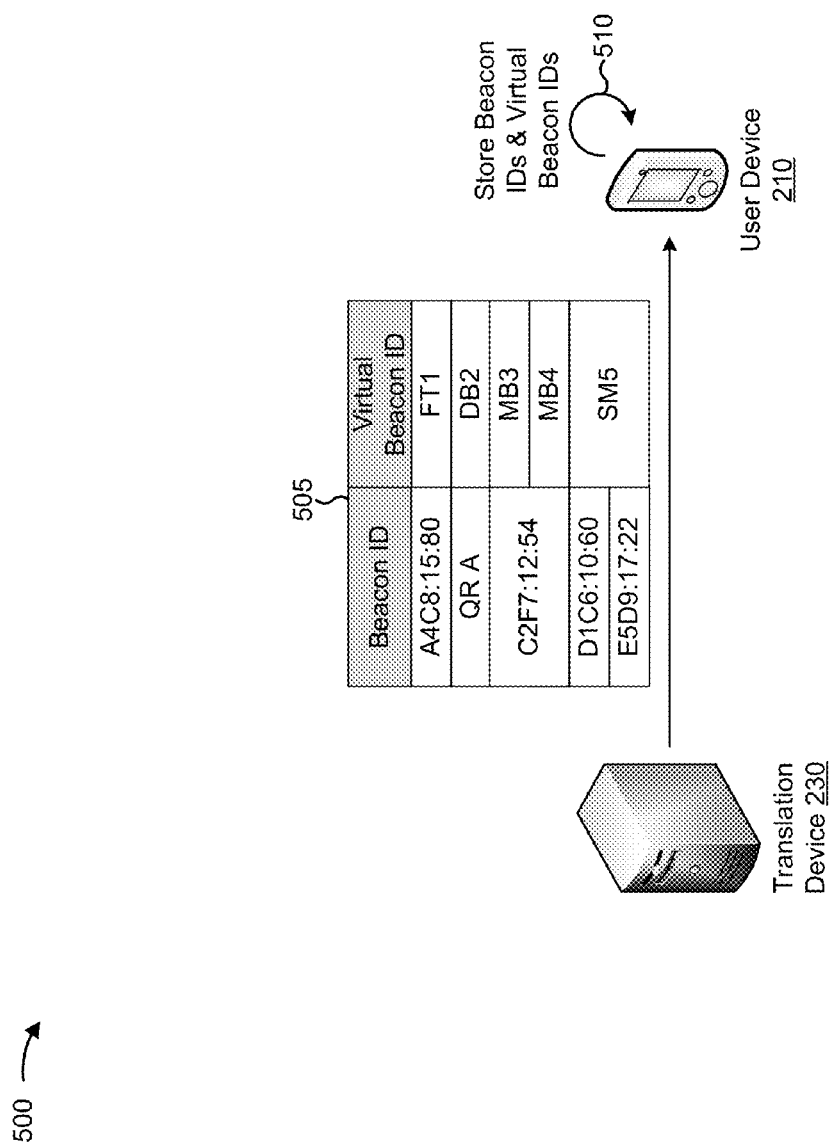
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that translation device 230 is positioned to provide virtual beacon information, associated with a set of beacon devices 220, to user device 210.

As shown in FIG. 5, and by reference number 505, translation device 230 may provide the virtual beacon information that includes a set of virtual beacon identifiers and a corresponding set of beacon identifiers. As shown, the virtual beacon information may include a first beacon identifier (e.g., A4C8:15:80) that corresponds to a first virtual beacon identifier (e.g., FT1), a second beacon identifier (e.g., a QR code identified as QR A) that corresponds to a second virtual beacon identifier (e.g., DB2), a third beacon identifier (e.g., C2F7:12:54) that corresponds to a third virtual beacon identifier (e.g., MB3) and a fourth virtual beacon identifier (e.g., MB4), and a fourth beacon identifier (e.g., D106:10:60) and a fifth beacon identifier (e.g., E5D9:17:22) that correspond to a fifth virtual beacon identifier (e.g., SM5). As shown by reference number 510, user device 210 may store the virtual beacon information (e.g., such that user device 210 may determine a virtual beacon identifier based on a beacon identifier at a later time).

As indicated above, FIG. 5 is provided merely as an example. Other examples are possible and may differ from what was described with regard to FIG. 5.

Figure 6:
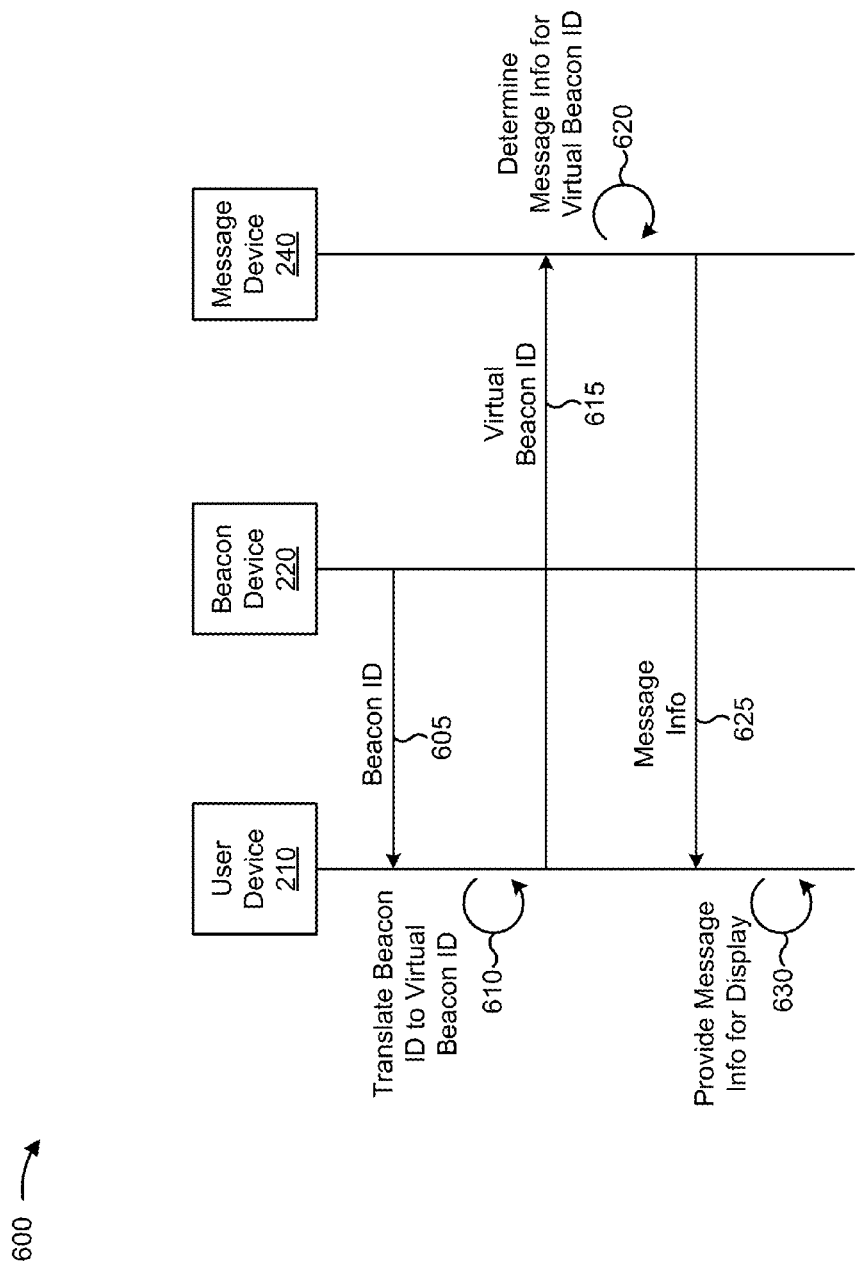
FIG. 6 is a call flow diagram of an example process for determining a virtual beacon identifier based on a beacon identifier, and providing message information associated with the virtual beacon identifier.

FIG. 6 is a call flow diagram of an example process 600 for determining a virtual beacon identifier based on a beacon identifier, and providing message information associated with the virtual beacon identifier. In some implementations, one or more process steps of FIG. 6 may be performed by one or more devices included in environment 200.

As shown in FIG. 6, process 600 may include receiving a beacon identifier (shown at reference number 605). For example, user device 210 may receive a beacon identifier from beacon device 220. In some implementations, user device 210 may receive the beacon identifier when beacon device 220 transmits the beacon identifier (e.g., when user device 210 is within a transmission area of beacon device 220). Additionally, or alternatively, user device 210 may receive the beacon identifier when user device 210 scans, detects, senses, or the like the beacon identifier (e.g., when user device 210 scans a QR code, when user device 210 detects an NFC tag, etc.).

As shown in FIG. 6, process 600 may include translating the beacon identifier to a virtual beacon identifier (shown at reference number 615). For example, user device 210 may translate the beacon identifier to a virtual beacon identifier. In some implementations, user device 210 may translate the beacon identifier to the virtual beacon identifier after user device 210 receives the beacon identifier.

In some implementations, user device 210 may translate the beacon identifier based on virtual beacon information stored or accessible by user device 210. For example, user device 210 may store or have access to virtual beacon information, as described above with regard to FIG. 4. Here, user device 210 may receive the beacon identifier, and may determine, based on the virtual beacon information, a virtual beacon identifier that corresponds to the beacon identifier.

Additionally, or alternatively, user device 210 may translate the beacon identifier based on profile information associated with user device 210. For example, user device 210 may determine (e.g., based on information stored or accessible by user device 210, based on user input) profile information associated with a user of user device 210 (e.g., demographic information associated with the user, membership information associated with the user, etc.), and may translate the beacon identifier based on the profile information. As an example, assume that a first virtual beacon identifier and a second virtual beacon identifier correspond to a beacon identifier, and that the virtual beacon information indicates that user device 210 is to translate the beacon identifier to the first virtual beacon identifier or the second virtual beacon identifier based on the age of a user of user device 210 (e.g., user device 210 may translate to the first virtual beacon identifier if the user is 21 or more years old, or may translate the beacon identifier to the second virtual beacon identifier if the user is less than 21 years old). Here, user device 210 may determine profile information, associated with the user, that includes information that identifies the age of the user, and may translate the beacon identifier accordingly.

Additionally, or alternatively, user device 210 may translate the beacon identifier based on another type of information, such as time information (e.g., a time of day, a range of hours, a range of days, a particular month, etc.) associated with the virtual beacon identifier. For example, assume that a first virtual beacon identifier and a second virtual beacon identifier correspond to a beacon identifier, and that the virtual beacon information indicates that user device 210 is to translate the beacon identifier to the first virtual beacon identifier or the second virtual beacon identifier based on a time of day at which user device 210 receives the beacon identifier (e.g., user device 210 may translate to the first virtual beacon identifier on or before noon, or may translate the beacon identifier to the second virtual beacon identifier after noon). Here, user device 210 may determine time information that includes information that identifies the time of day at which the beacon identifier was received, the time of day at which the beacon identifier was transmitted, or the like, and may translate the beacon identifier accordingly.

As shown in FIG. 6, process 600 may include providing the virtual beacon identifier to a message device (shown at reference number 615). For example, user device 210 may provide the virtual beacon identifier to message device 240. In some implementations, user device 210 may provide the virtual beacon identifier after user device 210 translates the beacon identifier to the virtual beacon identifier.

In some implementations, user device 210 may also provide profile information associated with user device 210. For example, user device 210 may provide the profile information associated with a user of user device 210. The profile information may include information associated with the user of user device 210. For example, the profile information may include demographic information associated with the user, such as a name of the user, an age of the user, a race of the user, an education level of the user, information indicating whether the user is a student, an income level of the user, a home address of the user, a work address of the user, information identifying an occupation of the user, or the like. As another example, the profile information may include entity membership information associated with the user (e.g., information indicating whether the user has a rewards account associated with an entity, information indicating whether the user has a discount card associated with an entity, information indicating whether the user is a member of a club or a plan of an entity, etc.). As yet another example, the profile information may include message activity information associated with the user (e.g., information indicating whether the user acted upon messages previously provided to user device 210, etc.). In some implementations, user device 210 may be associated with multiple users and user device 210 may provide profile information corresponding to one or more users of user device 210.

In some implementations, user device 210 may receive the profile information based on user input. For example, the user may provide, as input to user device 210, the profile information via a user profile user interface. Additionally, or alternatively, user device 210 may receive the profile information from another device, such as a device associated with the service provider of user device 210 (e.g., when the other device stores or has access to the user profile information). In some implementations, message device 240 may use the profile information to determine message information to be provided to user device 210, as described below.

As shown in FIG. 6, process 600 may include determining message information based on the virtual beacon identifier (shown at reference number 620). For example, message device 240 may determine the message information based on the virtual beacon identifier. In some implementations, message device 240 may determine the message information after message device 240 receives the message information. Additionally, or alternatively, message device 240 may determine the message information when message device 240 receives an indication that message device 240 is to determine the message information.

In some implementations, message device 240 may determine the message information based on information stored or accessible by message device 240, such as the profile information associated with user device 210, message preferences associated with user device 210 (e.g., information associated with limiting and/or filtering messages provided to user device 210 as a result of user device 210 being within a transmission area of beacon device 220), entity information associated with the virtual beacon identifier (e.g., information indicating that the virtual beacon identifier is associated with an entity), message content for the entity associated with the virtual beacon device (e.g., information, associated with the entity, that describes content that may be included in the message information to be provided to user device 210), or the like.

For example, message device 240 may determine (e.g., based on information that identifies user device 210) message preferences, associated with user device 210, and may receive the profile information associated with user device 210. Message device 240 may also identify (e.g., based on the virtual beacon identifier) an entity associated with the virtual beacon identifier, and may then determine (e.g., based on message content stored by message device 240) message content associated with the entity. Here, message device 240 may determine the message information based on using the message preferences, the profile information, the entity information, and/or the message content as inputs to a message generation algorithm (e.g., stored or accessible by message device 240), and receiving the message information as an output (e.g., where the message generation algorithm may generate message information that does not violate the message preferences, is tailored based on the profile information, contains message content tailored to the user, etc.).

Additionally, or alternatively, message device 240 may determine the message information by selecting (e.g., randomly, in a pre-defined order, in order of preference as set by the entity, etc.) message content to be included in the message information (e.g., as long as the message content does not violate the message preferences and/or conflict with the profile information).

Additionally, or alternatively, message device 240 may determine the message information based on information associated with a previous transaction between the user of user device 210 and the entity. For example, message device 240 may store and/or have access to transaction information associated with one or more previous transactions between the user and the entity associated with the virtual beacon identifier. In this example, message device 240 may identify message content, associated with the entity and to be included in the message information, based on the transaction information. Additionally, or alternatively, message device 240 may determine the message information in another manner.

In some implementations, message device 240 may determine the message information for a message in the form of a text message (e.g., a short message service (SMS) message, a multimedia messaging service (MMS) message, etc.), an email message, a video message, a web document (e.g., a hypertext markup language (HTML) document), a push notification, or another type of message.

As shown in FIG. 6, process 600 may include providing the message information to the user device (shown at reference number 625). For example, message device 240 may provide the message information to user device 210. In some implementations, message device 240 may provide the message information after message device 240 determines the message information. Additionally, or alternatively, message device 240 may provide the message information when message device 240 receives an indication that message device 240 is to provide the message information.

As shown in FIG. 6, process 600 may include providing the message information for display (shown at reference number 630). For example, user device 210 may provide the message information for display. In some implementations, user device 210 may provide the message information for display after user device 210 receives the message information. Additionally, or alternatively, user device 210 may provide the message information for display when user device 210 receives an indication that user device 210 is to provide the message information for display.

In some implementations, user device 210 may provide the message information such that the user may view a message (e.g., a text message, a video message, an email, a web document, etc.) associated with the message information. Additionally, or alternatively, user device 210 may provide, for display to the user, a notification associated the message information (e.g., such that the user may choose whether to view the message).

Although FIG. 6 shows example steps of process 600, in some implementations, process 600 may include additional steps, fewer steps, different steps, or differently arranged steps than those depicted in FIG. 6. Additionally, or alternatively, two or more of the steps of process 600 may be performed in parallel.

Figure 7:
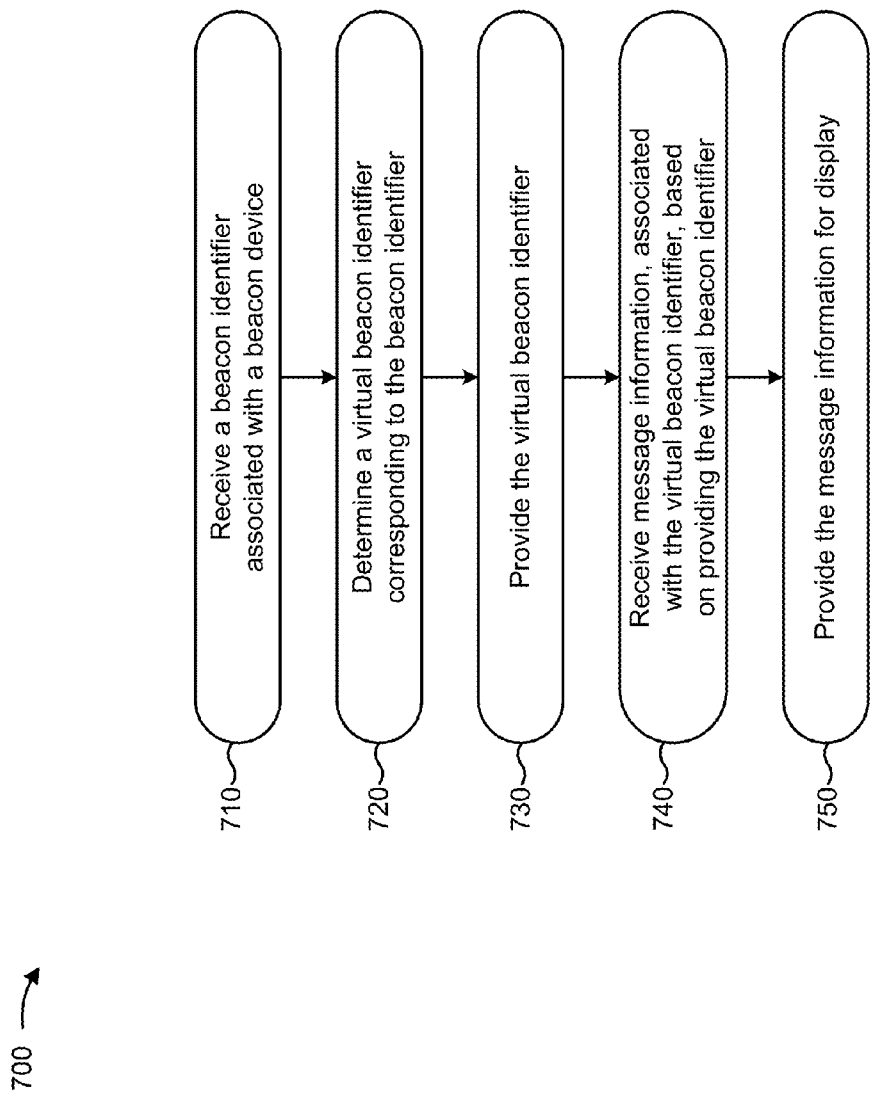
FIG. 7 is a flow chart of an example process for determining a virtual beacon identifier based on a beacon identifier, and providing message information associated with the virtual beacon identifier.

FIG. 7 is a flow chart of an example process 700 for determining a virtual beacon identifier based on a beacon identifier, and providing message information associated with the virtual beacon identifier. In some implementations, one or more process blocks of FIG. 7 may be performed by user device 210. In some implementations, one or more process blocks of FIG. 7 may be performed by another device or a set of devices separate from or including user device 210, such as beacon device 220, message device 240 and/or translation device 230.

As shown in FIG. 7, process 700 may include receiving a beacon identifier associated with a beacon device (block 710). For example, user device 210 may receive a beacon identifier associated with beacon device 220, as discussed above.

As further shown in FIG. 7, process 700 may include determining a virtual beacon identifier based on the beacon identifier (block 720). For example, user device 210 may determine a virtual beacon identifier corresponding to the beacon identifier based on translating the beacon identifier to the virtual beacon identifier, as discussed above.

As further shown in FIG. 7, process 700 may include providing the virtual beacon identifier (block 730). For example, user device 210 may provide the virtual beacon identifier, as discussed above.

As further shown in FIG. 7, process 700 may include receiving message information, associated with the virtual beacon identifier, based on providing the virtual beacon identifier (block 740). For example, user device 210 may receive message information, associated with the virtual beacon identifier, based on providing the virtual beacon identifier, as discussed above.

As further shown in FIG. 7, process 700 may include providing the message information for display (block 750). For example, user device 210 may provide the message information for display, as discussed above.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
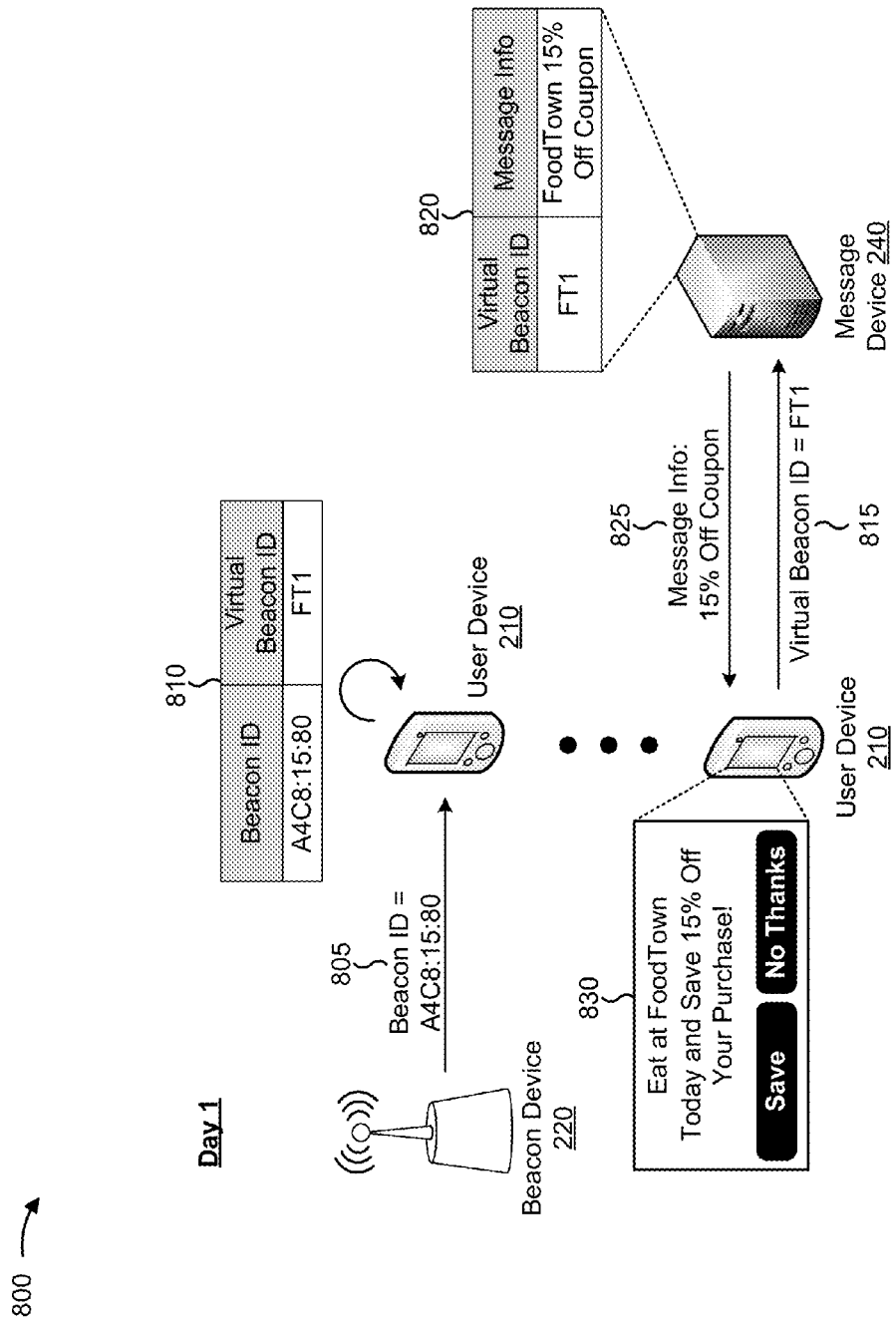
FIGS. 8A-8C are diagrams of an example implementation relating to the example process shown in FIG. 7.
Figure 8B:
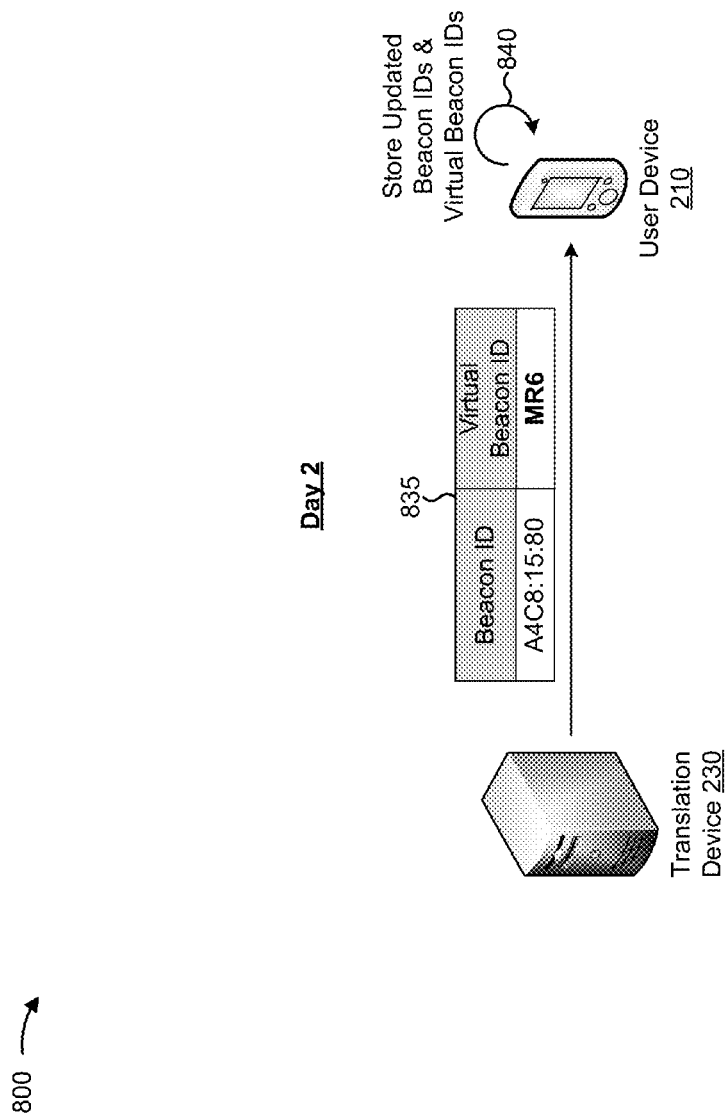
Figure 8C:
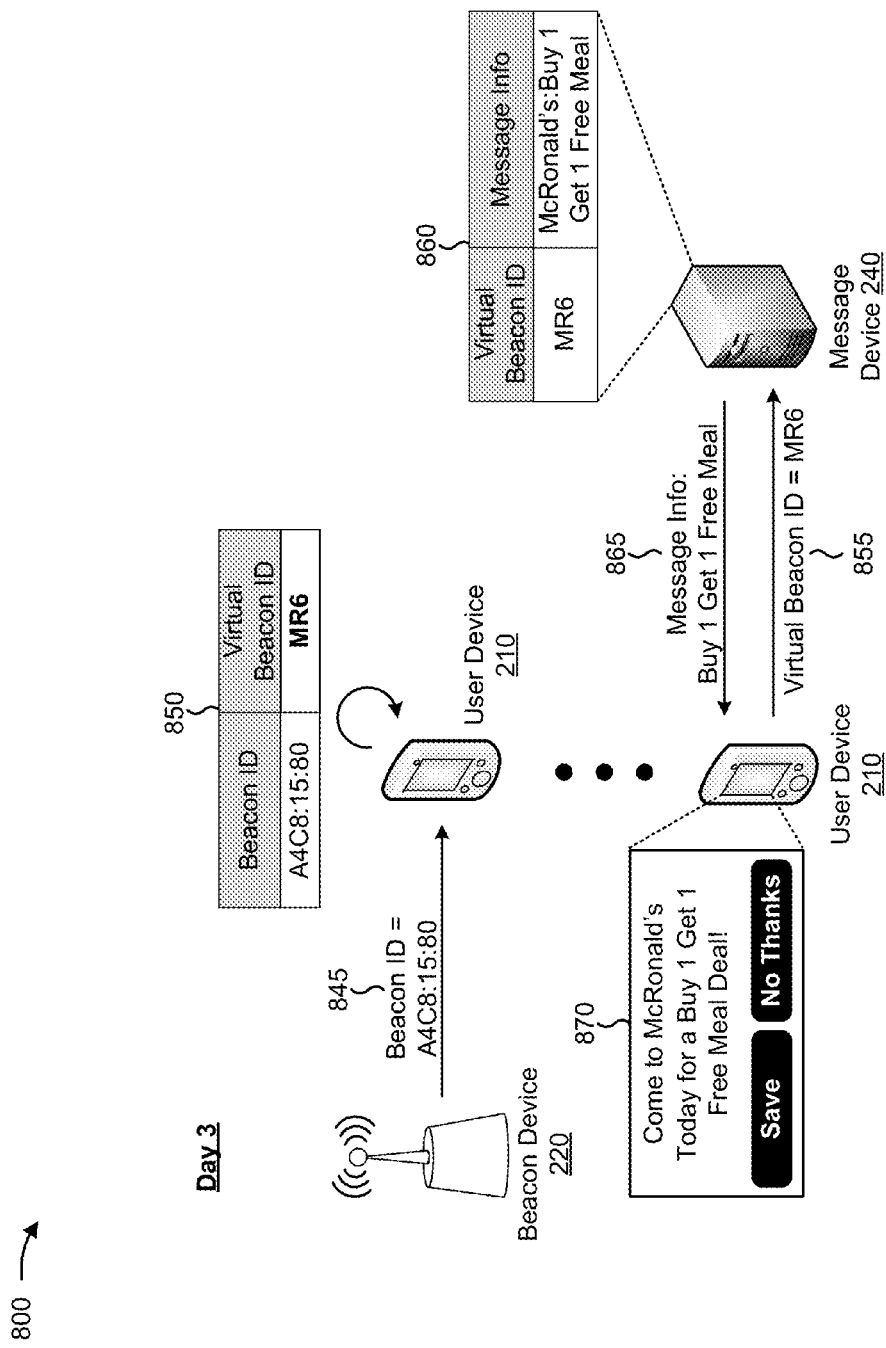

FIGS. 8A-8C are diagrams of an example implementation 800 relating to example process 700 shown in FIG. 7. For the purposes of example implementation 800, assume that user device 210 stores or has access to virtual beacon information associated with translating beacon identifiers to corresponding virtual beacon identifiers. Further, assume that user device 210 is located in a transmission area of beacon device 220 on a first day (e.g., day 1), and that a beacon device 220 identifier, and a corresponding virtual beacon identifier, are included in the virtual beacon information stored or accessible by user device 210.

As shown in FIG. 8A, and by reference number 805, user device 210 may receive the beacon device 220 identifier (e.g., A4C8:15:80) transmitted by beacon device 220. As shown by reference number 810, user device 210 may determine (e.g., based on the virtual beacon information stored or accessible by user device 210) a first virtual beacon identifier (e.g., FT1) to which the beacon device 220 identifier is to be translated. As shown by reference number 815, user device 210 may provide the first virtual beacon identifier to message device 240 configured to determine message information based on the first virtual beacon identifier.

As shown by reference number 820, message device 240 may determine (e.g., based on information stored or accessible by message device 240) first message information associated with the first virtual beacon identifier. As shown, the first message information may include information associated with a 15% off coupon at a FoodTown restaurant. As shown by reference number 825, message device 240 may provide the first message information to user device 210. As shown by reference number 830, user device 210 may receive the first message information, and may provide a first message, associated with the first message information, for display to a user (e.g., "Eat at FoodTown Today and Save 15% Off Your Order!").

For the purposes of FIG. 8B, assume that on a second day (e.g., day 2, immediately following day 1) translation device 230 receives updated virtual beacon information, associated with beacon device 220, indicating that the beacon device 220 identifier is to be translated to a second virtual beacon identifier (e.g., MR6) instead of the first virtual beacon identifier (e.g., FT1). As shown by reference number 835, translation device 230 may provide the updated virtual beacon information to user device 210. As shown by reference number 840, user device 210 may store the updated virtual beacon information.

For the purposes of FIG. 8C, assume that user device 210 is within the transmission area of beacon device 220 on a third day (e.g., day 3, immediately following day 2). As shown by reference number 845, user device 210 may receive the beacon device 220 identifier (e.g., A4C8:15:80) transmitted by beacon device 220. As shown by reference number 850, user device 210 may determine (e.g., based on the updated virtual beacon information stored or accessible by user device 210) the second virtual beacon identifier (e.g., MR6) to which the beacon device 220 identifier is to be translated. As shown by reference number 855, user device 210 may provide the second virtual beacon identifier to message device 240.

As shown by reference number 860, message device 240 may determine (e.g., based on the information stored or accessible by message device 240) second message information associated with the second virtual beacon identifier. As shown, the second message information may include information associated with a buy one, get one free offer from a McRonald's restaurant. As shown by reference number 865, message device 240 may provide the second message information to user device 210. As shown by reference number 870, user device 210 may receive the second message information, and may provide a second message, associated with the second message information, for display to the user (e.g., "Come to McRonald's Today for a Buy 1 Get 1 Free Meal Deal").

In this way, user device 210 may receive different messages (e.g., associated with FoodTown or McRonald's) based on the same beacon device 220 identifier being translated to different virtual beacon identifiers. As also shown, the entity associated with beacon device 220 may be changed (e.g., from FoodTown to McRonald's) without requiring a manual update of beacon device 220.

As indicated above, FIGS. 8A-8C are provided merely as an example. Other examples are possible and may differ from what was described with regard to FIGS. 8A-8C.

Figure 9A:
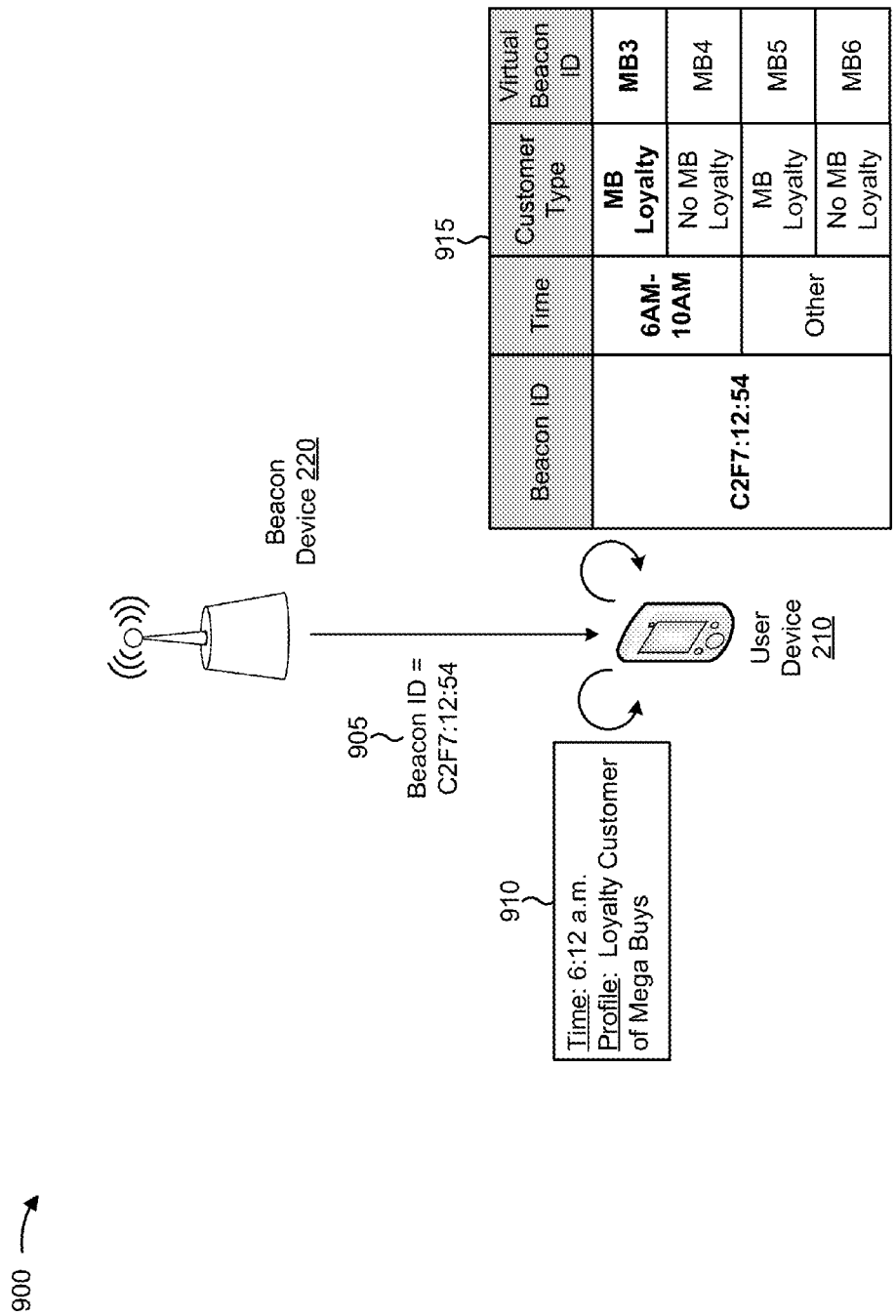
FIGS. 9A and 9B are diagrams of an additional example implementation relating to the example process shown in FIG. 7.
Figure 9B:
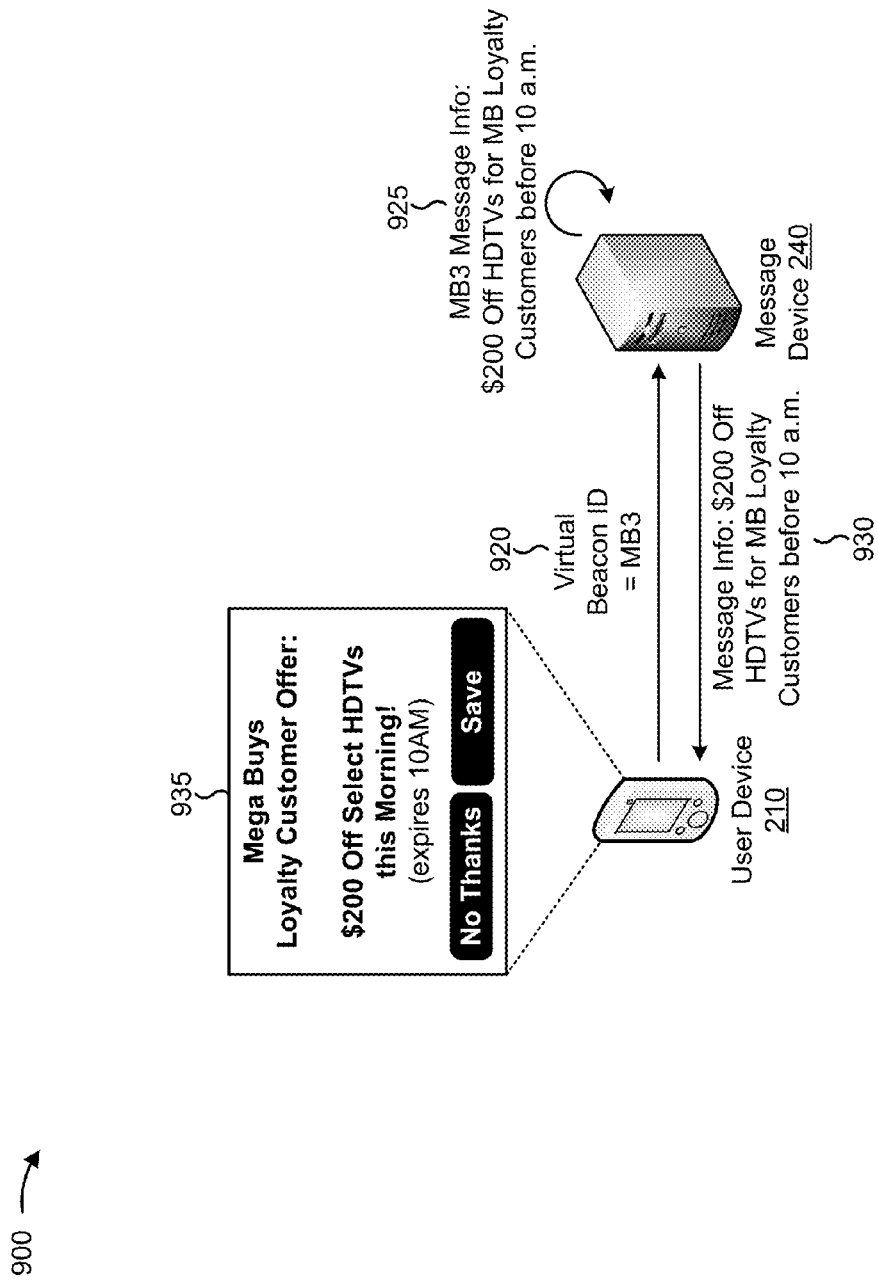

FIGS. 9A and 9B are diagrams of an additional example implementation 900 relating to example process 700 shown in FIG. 7. For the purposes of example implementation 900, assume that user device 210 stores or has access to virtual beacon information associated with translating beacon identifiers to corresponding virtual beacon identifiers. Further, assume that user device 210 is located in a transmission area of beacon device 220, and that a beacon device 220 identifier, and multiple corresponding virtual beacon identifiers, are included in the virtual beacon information stored or accessible by user device 210.

As shown in FIG. 9A, and by reference number 905, user device 210 may receive the beacon device 220 identifier (e.g., C2F7:12:54) transmitted by beacon device 220. As shown by reference number 910, user device 210 may determine time information associated with user device 210 (e.g., information indicating that user device 210 received the beacon device 220 identifier at 6:12 a.m.) and profile information associated with user device 210 (e.g., information indicating that the user of user device 210 is a loyalty customer of a Mega Buys store). As shown by reference number 915, user device 210 may determine (e.g., based on the virtual beacon information stored or accessible by user device 210, the time information, and the profile information) a virtual beacon identifier (e.g., MB3) to which the beacon device 220 identifier is to be translated. As shown, user device 210 may translate the beacon device 220 identifier to MB3 (e.g., rather than MB4, MB5, or MB6) based on the time information (e.g., since user device 210 received the beacon device 220 identifier between 6:00 a.m. and 10:00 a.m.) and the profile information (e.g., since the user is a loyalty customer of the Mega Buys store).

As shown in FIG. 9B, and by reference number 920, user device 210 may provide the virtual beacon identifier to message device 240 configured to determine message information based on the virtual beacon identifier. As shown by reference number 925, message device 240 may determine (e.g., based on information stored or accessible by message device 240) message information associated with the virtual beacon identifier. As shown, the message information may include information associated with a $200.00 off select HDTVs for loyalty customers of the Mega Buys store before 10:00 a.m. As shown by reference number 930, message device 240 may provide the message information to user device 210. As shown by reference number 935, user device 210 may receive the message information, and may provide a message, associated with the message information, for display to the user (e.g., "Mega Buys Loyalty Offer: $200 Off Select HDTVs this Morning (expires 10 AM)"). In this way, user device 210 may translate the beacon device 220 identifier by selecting a particular virtual beacon identifier from multiple virtual beacon identifiers corresponding to the beacon device 220 identifier.

As indicated above, FIGS. 9A and 9B are provided merely as an example. Other examples are possible and may differ from what was described with regard to FIGS. 9A and 9B.

Implementations described herein may allow a user device to translate a beacon identifier, associated with a beacon device, to one or more virtual beacon identifiers associated with one or more entities. By implementing such beacon translation, the one or more entities, associated with the beacon device, may be changed without requiring a manual update of the beacon device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more devices to:
  receive virtual beacon information associated with a beacon device;
  receive a beacon identifier;
  translate the beacon identifier to a virtual beacon identifier, of a plurality of virtual beacon identifiers, based on the virtual beacon information,
    the virtual beacon identifier being associated with a particular entity of a plurality of entities;

determine message information based on the virtual beacon identifier,
the message information including information associated with a message to be provided for display to a user, and
the message information being associated with the particular entity; and
provide, for display to the user, the message associated with the message information.

2. The system of claim 1, where the virtual beacon information includes information indicating that the virtual beacon identifier corresponds to the beacon identifier.

3. The system of claim 1, where the virtual beacon information includes information indicating that multiple virtual beacon identifiers correspond to the beacon identifier,
the multiple virtual beacon identifiers including the virtual beacon identifier; and
where the one or more devices are further to:
select the virtual beacon identifier from the multiple virtual beacon identifiers.

4. The system of claim 3, where the one or more devices are further to:
determine profile information associated with the user,
the profile information including information relating to the user; and
where the one or more devices, when selecting the virtual beacon identifier, are to:
select the virtual beacon identifier based on the profile information associated with the user.

5. The system of claim 1, where the beacon identifier is received at a first time, the virtual beacon identifier is a first virtual beacon identifier, the particular entity is a first entity, the message information is first message information, and the message is a first message; and
where the one or more devices are further to:
receive the beacon identifier at a second time,
the second time being different than the first time;
translate the beacon identifier to a second virtual beacon identifier,
the second virtual beacon identifier being associated with a second entity;
determine second message information based on the second virtual beacon identifier,
the second message information including information associated with a second message to be provided for display to the user, and
the second message information being associated with the second entity; and
provide, for display to the user, the second message associated with the second message information.

6. The system of claim 5, where the virtual beacon information is first virtual beacon information;
where the one or more devices are further to:
receive second virtual beacon information,
the second virtual beacon information indicating that the beacon identifier is associated with the second entity rather than the first entity; and
where the one or more devices, when translating the beacon identifier to the second virtual beacon identifier, are to:
translate the beacon identifier to the second virtual beacon identifier based on the second virtual beacon information.

7. The system of claim 1, where the one or more devices, when receiving the beacon identifier, are to at least one of:
receive the beacon identifier based on a transmission from the beacon device;
receive the beacon identifier based on scanning a quick response (QR) code; or
receive the beacon identifier based on detecting a near-field communication (NFC) tag.

8. A non-transitory computer-readable medium storing instructions, the instructions comprising:
one or more instructions that, when executed by one or more processors, cause the one or more processors to:
receive virtual beacon information associated with a beacon device;
receive a beacon identifier;
determine a virtual beacon identifier, of a plurality of virtual beacon identifiers, corresponding to the beacon identifier based on the virtual beacon information,
the virtual beacon identifier being associated with a particular entity of a plurality of entities;
identify message information associated with the virtual beacon identifier,
the message information including information associated with a message to be provided for display to a user, and
the message information being associated with the particular entity; and
provide, for display to the user, the message associated with the message information.

9. The non-transitory computer-readable medium of claim 8, where the virtual beacon information includes information indicating that the virtual beacon identifier corresponds to the beacon identifier.

10. The non-transitory computer-readable medium of claim 8, where the virtual beacon information includes information indicating that multiple virtual beacon identifiers correspond to the beacon identifier,
the multiple virtual beacon identifiers including the virtual beacon identifier; and
where the one or more instructions, when executed by the one or more processors, further cause the one or more processors to:
select the virtual beacon identifier from the multiple virtual beacon identifiers.

11. The non-transitory computer-readable medium of claim 10, where the one or more instructions, when executed by the one or more processors, further cause the one or more processors to:
determine time information associated with the beacon identifier,
the time information identifying a time at which the beacon identifier was transmitted or received; and
where the one or more instructions, that cause the one or more processors to select the virtual beacon identifier, cause the one or more processors to:
select the virtual beacon identifier based on the time information.

12. The non-transitory computer-readable medium of claim 8, where the beacon identifier is received at a first time, the virtual beacon identifier is a first virtual beacon identifier, the particular entity is a first entity, the message information is first message information, and the message is a first message; and
where the one or more instructions, when executed by the one or more processors, further cause the one or more processors to:
receive the beacon identifier at a second time,
the second time being different than the first time;

determine a second virtual beacon identifier corresponding to the beacon identifier,
the second virtual beacon identifier being associated with a second entity;
identify second message information associated with the second virtual beacon identifier,
the second message information including information associated with a second message to be provided for display to the user, and
the second message information being associated with the second entity; and
provide, for display to the user, the second message associated with the second message information.

13. The non-transitory computer-readable medium of claim 12, where the virtual beacon information is first virtual beacon information;
where the one or more instructions, when executed by the one or more processors, further cause the one or more processors to:
receive second virtual beacon information,
the second virtual beacon information indicating that the beacon identifier is associated with the second entity rather than the first entity; and
where the one or more instructions, that cause the one or more processors to determine the second virtual beacon identifier, cause the one or more processors to:
determine the second virtual beacon identifier based on the second virtual beacon information.

14. The non-transitory computer-readable medium of claim 8, where the one or more instructions, that cause the one or more processors to receive the beacon identifier, cause the one or more processors to at least one of:
receive the beacon identifier based on a transmission from the beacon device;
receive the beacon identifier based on scanning a quick response (QR) code; or
receive the beacon identifier based on detecting a near-field communication (NFC) tag.

15. A method, comprising:
receiving, by one or more devices, virtual beacon information associated with a beacon device;
determining, by the one or more devices, a beacon identifier;
translating, by the one or more devices, the beacon identifier to a virtual beacon identifier, of a plurality of virtual beacon identifiers, based on the virtual beacon information,
the virtual beacon identifier being associated with a particular entity of a plurality of entities;
determining, by the one or more devices, message information based on the virtual beacon identifier,
the message information including a message to be displayed to a user, and
the message information being associated with the particular entity; and
presenting, by the one or more devices and for display to the user, the message included in the message information.

16. The method of claim 15, where the virtual beacon information includes information indicating that the virtual beacon identifier corresponds to the beacon identifier.

17. The method of claim 15, where the virtual beacon information includes information indicating that multiple virtual beacon identifiers correspond to the beacon identifier,
the multiple virtual beacon identifiers including the virtual beacon identifier; and
where the method further comprises:
determining profile information associated with the user; and
selecting the virtual beacon identifier, from the multiple virtual beacon identifiers, based on the profile information.

18. The method of claim 15, where the beacon identifier is determined at a first time, the virtual beacon identifier is a first virtual beacon identifier, the particular entity is a first entity, the message information is first message information, and the message is a first message; and
where the method further comprises:
determining, at a second time, the beacon identifier,
the second time being different than the first time;
translating the beacon identifier to a second virtual beacon identifier,
the second virtual beacon identifier being associated with a second entity;
determining second message information based on the second virtual beacon identifier,
the second message information including a second message to be provided for display to the user, and
the second message information being associated with the second entity; and
presenting, for display to the user, the second message included in the second message information.

19. The method of claim 18, where the virtual beacon information is first virtual beacon information; and
where the method further comprises:
receiving second virtual beacon information,
the second virtual beacon information indicating that the beacon identifier is associated with the second entity rather than the first entity; and
where translating the beacon identifier to the second virtual beacon identifier comprises:
translating the beacon identifier to the second virtual beacon identifier based on the second virtual beacon information.

20. The method of claim 15, where determining the beacon identifier comprises at least one of:
determining the beacon identifier based on a transmission by the beacon device;
determining the beacon identifier based on scanning a quick response (QR) code; or
determining the beacon identifier based on detecting a near-field communication (NFC) tag.

* * * * *